(12) United States Patent
Mailliu et al.

(10) Patent No.: US 8,888,044 B2
(45) Date of Patent: Nov. 18, 2014

(54) AIRCRAFT PROVIDED WITH A BUOYANCY SYSTEM FOR A ROTARY ELEMENT

(71) Applicant: Airbus Helicopters, Marignane, Cedex (FR)

(72) Inventors: Dominique Mailliu, Saint Chamas (FR); Marc Denante, Marseilles (FR)

(73) Assignee: Airbus Helicopters, Marignane Cedex (FR)

( * ) Notice: Subject to any disclaimer, the term of this patent is extended or adjusted under 35 U.S.C. 154(b) by 85 days.

(21) Appl. No.: 13/654,576

(22) Filed: Oct. 18, 2012

(65) Prior Publication Data

US 2013/0105625 A1 May 2, 2013

(30) Foreign Application Priority Data

Oct. 27, 2011 (FR) ...................................... 11 03269

(51) Int. Cl.
| | | |
|---|---|---|
| *B64C 25/56* | (2006.01) | |
| *B64C 11/00* | (2006.01) | |
| *B64C 27/26* | (2006.01) | |
| *B64D 25/18* | (2006.01) | |
| *B64C 27/00* | (2006.01) | |
| *B64C 27/28* | (2006.01) | |

(52) U.S. Cl.
CPC .............. *B64D 25/18* (2013.01); *B64C 11/001* (2013.01); *B64C 27/26* (2013.01); *B64C 27/006* (2013.01); *B64C 27/28* (2013.01); *B64D 2201/00* (2013.01)
USPC .......................... 244/121; 244/107; 244/53 B

(58) Field of Classification Search
USPC .......... 244/100 A, 101, 105, 106, 107, 17.15, 244/17.17, 134 A, 121, 139, 53 B, 34 A, 244/12.2, 12.3, 12.6, 23 B, 23 C; 55/306; 440/37; 60/39.092; 239/265.43; 416/84–86, 247 A
See application file for complete search history.

(56) References Cited

U.S. PATENT DOCUMENTS

| | | | | |
|---|---|---|---|---|
| 1,862,803 A | * | 6/1932 | Porter | ........................... 244/12.6 |
| 2,400,388 A | * | 5/1946 | Campbell | ...................... 244/113 |
| 2,960,281 A | * | 11/1960 | Jumelle et al. | .............. 244/53 B |
| 3,074,232 A | * | 1/1963 | Soyer | ........................... 244/53 B |
| 3,547,377 A | | 12/1970 | Frey | |

(Continued)

FOREIGN PATENT DOCUMENTS

| | | |
|---|---|---|
| CA | 2481789 A1 | 4/2005 |
| DE | 19820260 A1 | 11/1999 |
| FR | 1383688 A | 12/1964 |
| WO | 2008054401 A2 | 5/2008 |

OTHER PUBLICATIONS

Search Report and Written Opinion; Application No. FR 1103269; dated May 31, 2012.

*Primary Examiner* — Timothy D Collins
*Assistant Examiner* — Richard R Green
(74) *Attorney, Agent, or Firm* — Brooks Kushman P.C.

(57) ABSTRACT

The present invention relates to an aircraft (1) provided with at least one rotary element (10) provided with blades (11) liable to come into contact with a liquid surface (100) on ditching, said aircraft including a buoyancy system. The aircraft includes a fairing (15) surrounding at least part of said rotary element (10), the fairing (15) including an inflatable emergency float (20) of the buoyancy system for preventing said blades (11) from coming into contact with the liquid surface when in an inflated position.

19 Claims, 4 Drawing Sheets

(56) References Cited

U.S. PATENT DOCUMENTS

| 7,156,033 | B2 | 1/2007 | Mears |
| 7,954,752 | B2 | 6/2011 | Smith |
| 2004/0129831 | A1 | 7/2004 | Dunagin |
| 2004/0226498 | A1 | 11/2004 | Mears |
| 2005/0077426 | A1 | 4/2005 | Simard |
| 2006/0006281 | A1* | 1/2006 | Sirkis ................. 244/100 A |

* cited by examiner

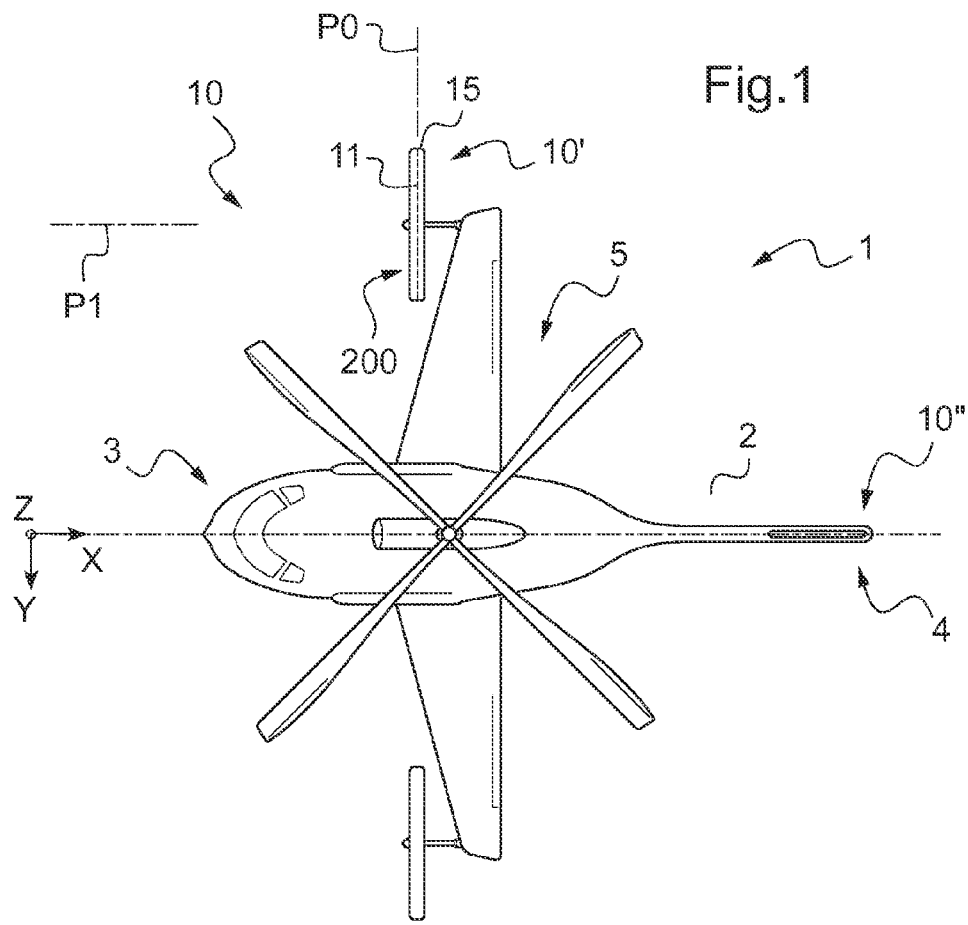
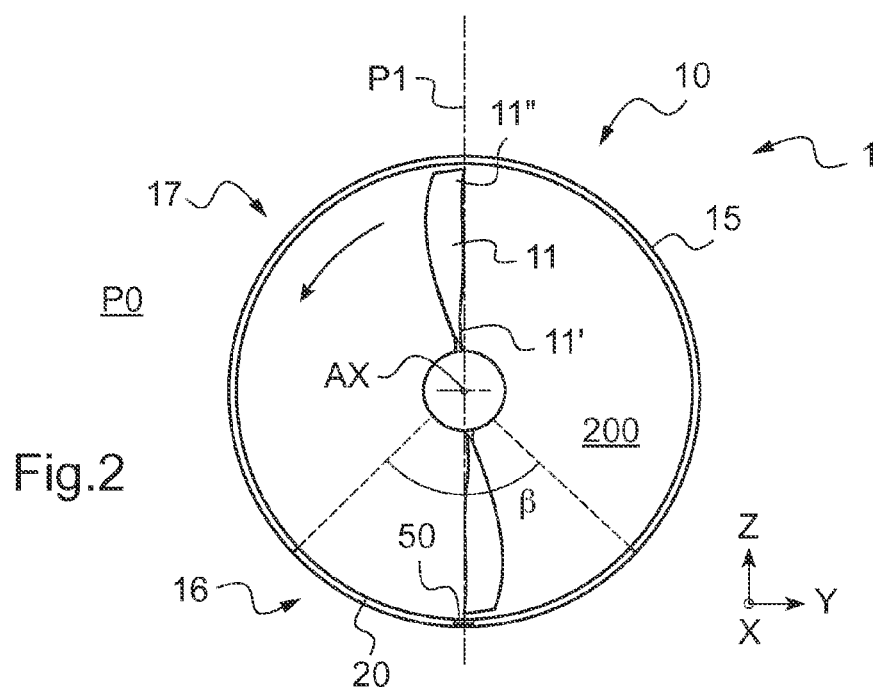

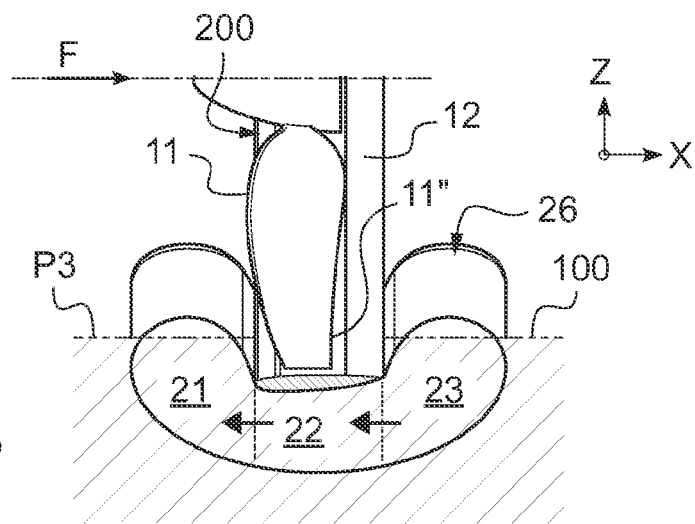
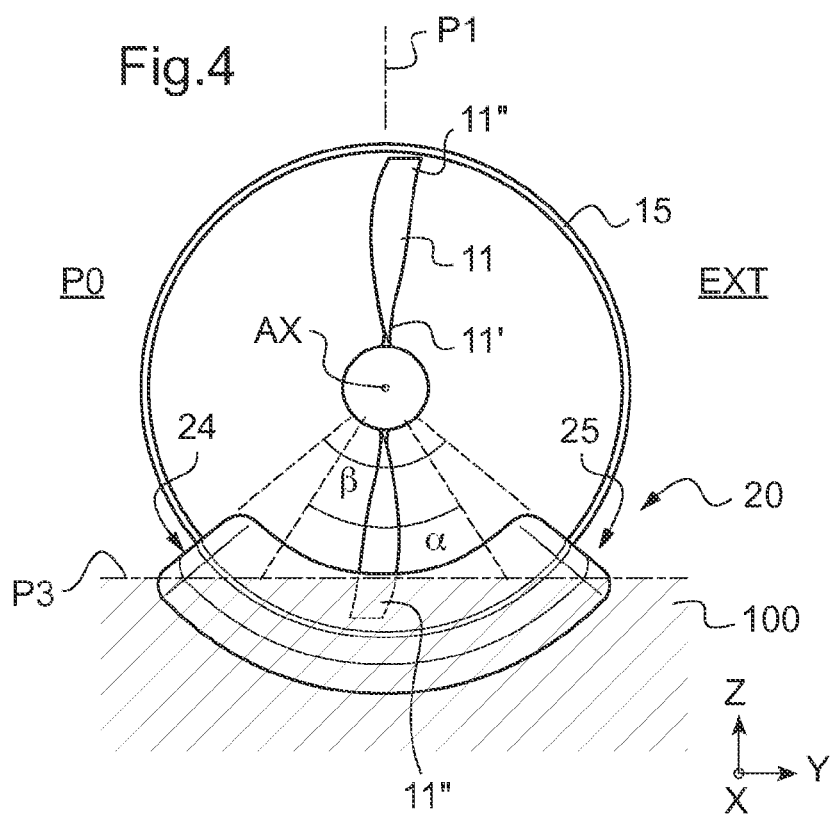

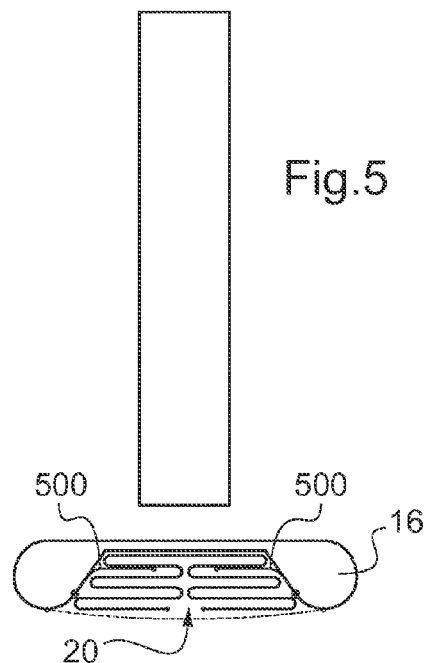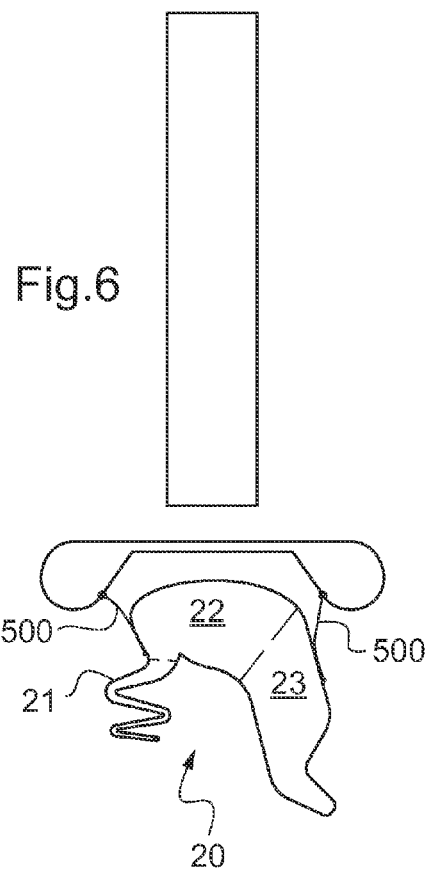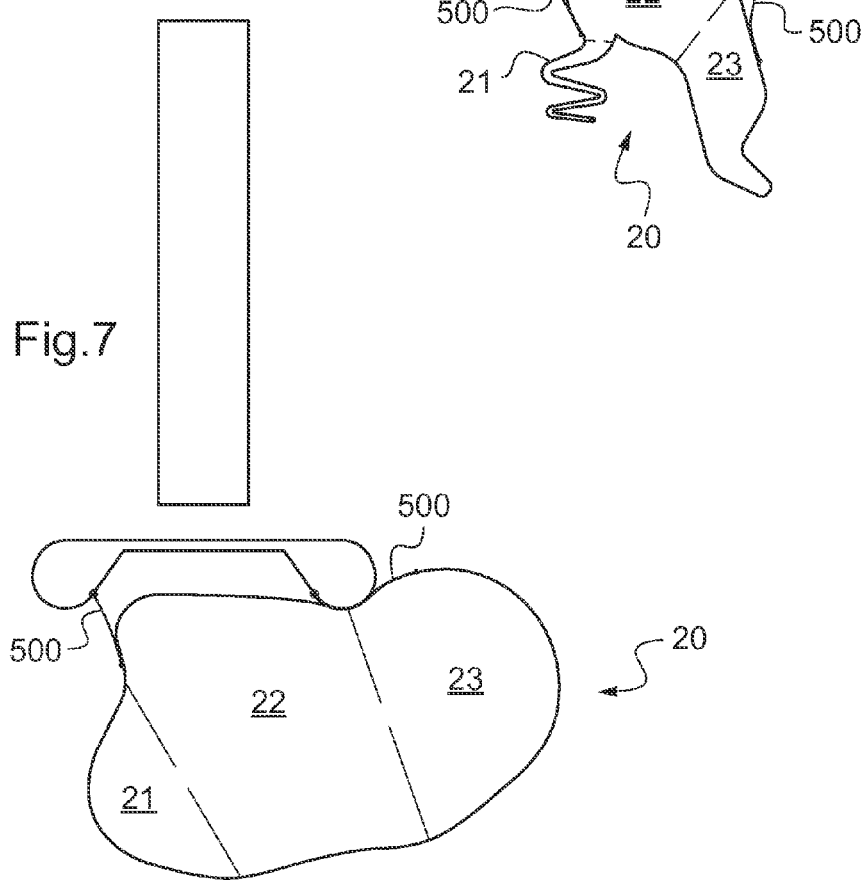

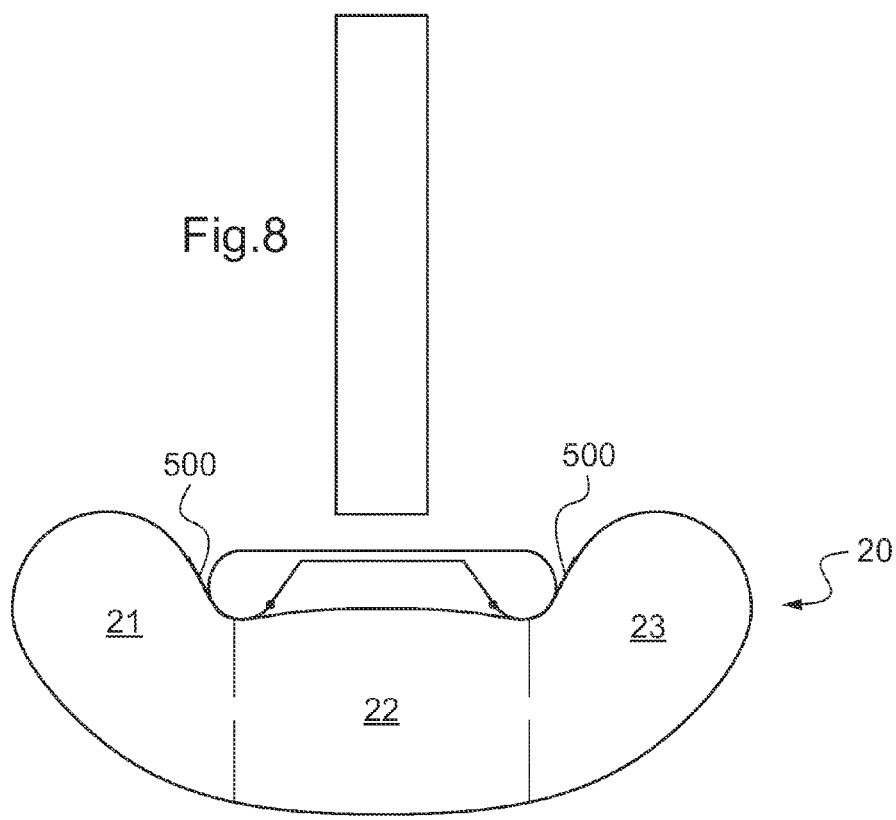
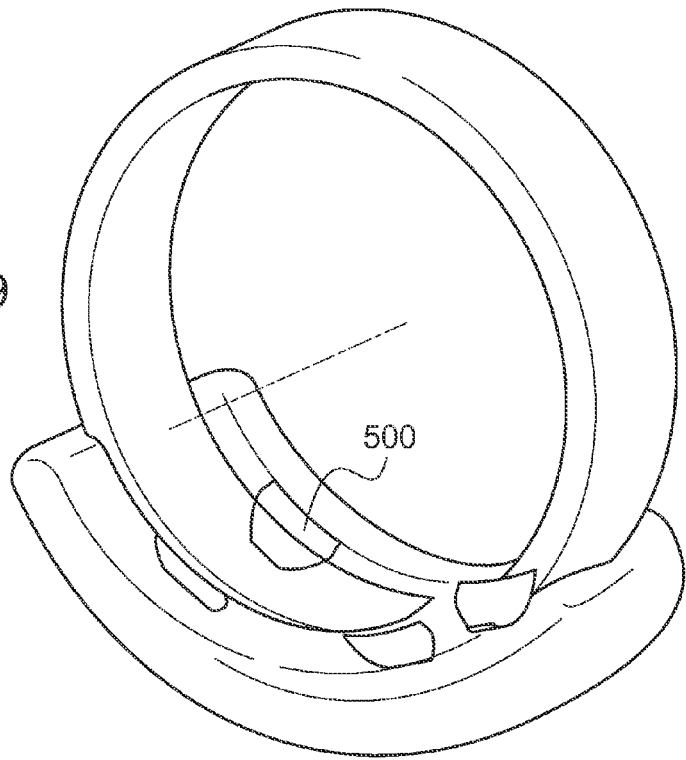

AIRCRAFT PROVIDED WITH A BUOYANCY SYSTEM FOR A ROTARY ELEMENT

CROSS REFERENCE TO RELATED APPLICATIONS

This application claims priority to French patent application No. FR 11 03269 filed on Oct. 27, 2011, the disclosure of which is incorporated in its entirety by reference herein.

BACKGROUND OF THE INVENTION (1) Field of the Invention

The present invention relates to an aircraft provided with a buoyancy system for a rotary element.

Under such circumstances, the invention lies in the technical field of buoyancy systems enabling an aircraft to ditch, and more particularly an aircraft that includes a rotary element that is liable to impact a liquid surface.

(2) Description of Related Art

The term "rotary element" is used in particular to designate a propulsive propeller, or indeed a tail rotor of an aircraft used for controlling the yaw movement of the aircraft and/or for opposing the torque exerted by a lift rotor on a fuselage, for example.

Such an emergency buoyancy system participates in keeping an aircraft afloat and stable in the event of forced ditching, thereby enabling the occupants of the aircraft to be evacuated. All aircraft for use in missions of transporting people over areas of sea are in principle fitted with such buoyancy systems.

An emergency buoyancy system has floats that are deployed either under the control of the pilot and/or the copilot, or else under automatic triggering, in particular by means of an immersion detector. Such floats may comprise bags that are inflated by deployment means that may be explosive or electrical, for example.

Document WO 2008/054401 discloses a system enabling anti-crash airbags to be inflated, by taking account of the attitude of the aircraft and of it approaching the ground at an excessive speed.

Document U.S. Pat. No. 7,156,033 B2 discloses a buoyancy system associated with inhibit means.

Document FR 1 383 688 describes a helicopter having inflatable floats.

Document CA 2 481 789 suggests using an immersion sensor associated with an acceleration sensor for triggering inflation of a float.

The following documents are also known: U.S. Pat. No. 3,547,377 A, DE 198 20 260 A1, U.S. 2004/226498 A1, and U.S. 2004/129831 A1.

For aircraft having rotary elements, it is preferable to avoid the rotary elements coming into contact with the liquid surface.

With a rotorcraft, a main rotor providing lift and possibly also propulsion is located sufficiently high to minimize any risk of the main rotor interfering with a liquid surface.

In contrast, the rotary element(s) that perform the anti-torque function during the ditching stage, such as propellers or an optionally ducted tail rotor occupy a position that makes it possible they will come into contact with a liquid surface.

BRIEF SUMMARY OF THE INVENTION

An object of the present invention is thus to propose an aircraft that is provided with a buoyancy system seeking to keep the aircraft on a liquid surface or indeed to enable rotary elements of the rotor or propeller type to rotate when the aircraft is resting on the liquid surface.

According to the invention, an aircraft is provided with at least one rotary element provided with blades liable to come into contact with a liquid surface on ditching, said aircraft including a buoyancy system.

The aircraft is remarkable in particular in that it includes a fairing surrounding at least part of the rotary element, the fairing including an inflatable emergency float of the buoyancy system for preventing the blades from coming into contact with the liquid surface when in an inflated position.

Consequently, the rotary element is a member that is ducted at least in part so as to present a fairing facing the contact surface such as ground or a liquid surface, or indeed a member that is completely ducted such as a ducted tail rotor, e.g. of the Fenestron® type, or a ducted propeller.

The fairing includes a float that may either be in a folded position during a normal flight, or else in an inflated position when ditching.

In the inflated position, the float protects the blades of the rotary element in order to avoid contact between the blades and the liquid surface. It should be observed that the blades may continue to be driven in rotation when the aircraft has touched down on the liquid so that they continue to perform their function, in particular an anti-torque function.

Furthermore, the float improves the stability of the aircraft on the liquid surface and serves to reduce the risk of damage to the blades and to the power transmission connecting a power plant to the rotary element.

It can be understood that the buoyancy system may also be provided with other emergency inflatable members, e.g. arranged along the fuselage. Reference may be made to the literature in order to obtain information about such members.

Similarly, the aircraft includes means for triggering deployment of various floats prior to ditching. The means known in the prior art are suitable.

The aircraft may include one or more of the following characteristics.

For example, the fairing may have a bottom portion facing the ground when the aircraft is standing on the ground, and the float may be folded in the bottom portion other than during a ditching stage in order to occupy a folded position.

In a normal flight, i.e. when not ditching, the float is thus folded within the fairing, and more particularly in a bottom portion of the fairing so as to enable it to be deployed appropriately, where necessary.

It can be understood that the fairing includes a weak zone suitable for being broken during deployment of the float.

In another aspect, the aircraft may include inflation means for deploying the float outwards from the rotary element into an inflated position prior to ditching, i.e. into a position outside the volume defined by the fairing and within which the blades of the rotary element move.

The purpose of this characteristic is to avoid contact between the blades of the rotary element and the float while ditching.

In accordance with a variant, the float may have in succession in the flow direction of the air flow through the rotary element: an upstream portion, then a central portion arranged under the fairing, and a downstream portion; and the aircraft may include inflation means for deploying the float before ditching by successively inflating the downstream portion then the central portion and the upstream portion.

This inflation sequence serves to minimize the risk of a portion of the float being caught by the rotary element and torn by the blades of the rotary element.

Under such circumstances, the inflation means may open out into the downstream portion, the downstream portion communicating with the central portion, the central portion communicating with the upstream portion in order to implement the above-specified inflation sequence.

In another aspect, in order to optimize protection of the rotary element, the float may extend up along the fairing on either side of a vertical plane of symmetry, the vertical plane of symmetry containing the axis of rotation of the blades of the rotary element and in contact with the liquid surface after ditching.

In addition, assuming the liquid surface (ignoring waves) is contained in a plane that is horizontal when the float is in an inflated position, the float can rise along the fairing on either side of a vertical plane of symmetry so that the horizontal plane is in register with a free end of the blades when the blades are moving in a given minimum angular sector.

In other words, while the blades are rotating about the axis of rotation of the rotary elements, the free end of each blade may go below the waterline of the aircraft, which waterline is contained in the horizontal plane. It should be observed that the shape of the float nevertheless enables contact to be avoided between the free end and the liquid surface within said given minimum angular sector.

It then becomes possible to maximize immersion of the aircraft in order to improve its stability on the liquid surface.

Surprisingly, the invention thus proposes a float that enables a portion of a blade of a rotary element to go beneath the waterline of the aircraft while still preventing said portion from coming into contact with the liquid surface.

To this end, the float may be toroidal in shape when in the inflated position, the toroidal shape being generated by causing a C-shaped section containing the fairing to turn about an axis of rotation of the blades of the rotary element, a concave face of the C-shaped section facing towards the axis of rotation.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a view of an aircraft of the invention;

FIG. 2 is a front view of a rotary element of the aircraft having a float in the folded position;

FIG. 3 is a section through a rotary element of the aircraft having a float in the inflated position;

FIG. 4 is a front view of a rotary element of the aircraft having a float in the inflated position;

FIG. 5 is a section of a float folded in a fairing;

FIGS. 6 to 8 are sections for clarifying an inflation sequence of the float; and FIG. 9 is a three-dimensional view of a deployed float.

Elements that are present in more than one of the figures are given the same references in each of them.

DETAILED DESCRIPTION OF THE INVENTION

It can be seen that three mutually orthogonal directions X, Y, and Z are shown in some figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

FIG. 1 shows an aircraft 1 having a fuselage 2 extending longitudinally from a front end 3 to a rear end 4.

The aircraft may have a rotary wing 5.

Furthermore, the aircraft has at least one rotary element 10 that runs the risk of coming into contact with a liquid surface in the event of ditching, in particular as a result of incorrect operation by a pilot.

Such a rotary element 10 may comprise a propeller 10' suitable for contributing to propelling the aircraft and/or for controlling yaw movements of the aircraft, or indeed a tail rotor 10" contributing to controlling yaw movements of the aircraft, e.g. a Fenestron®. This list is not limiting, since the invention applies to any type of rotary element that has a plurality of blades 11.

This aircraft also includes a buoyancy system for keeping the aircraft afloat on a liquid surface, the buoyancy system possibly including inflatable elements fastened to the fuselage 2, for example.

With reference to FIG. 2, at least one rotary element 10, and advantageously each rotary element, is then provided with a fairing 15, the fairing 15 defining the circumference of a volume 200 in which the blades 11 of the rotary element in question move.

Consequently, each blade 11 of a rotary element extends from a root 11' fastened to a hub towards a free end 11". Under such circumstances, under drive from the hub, the blades 11 rotate about an axis of rotation AX in a plane, referred to for convenience as the "vertical plane of rotation P0", within the volume 200 defined by the fairing 15.

It should be observed that the axis of rotation AX is contained in a plane referred to as the "vertical plane of symmetry P1", the vertical plane of symmetry P1 being perpendicular to the plane of rotation P0 and being in contact with the liquid surface after ditching.

The buoyancy system includes an inflatable float 20 arranged in the fairing 15 of a rotary element of the invention so as to avoid interference between a liquid surface and the blades 11 while ditching. Each rotary element may include such a float.

In the folded position shown in FIG. 2, the fairing 15 has a bottom portion 16 that faces the ground when the aircraft is on land, and a top portion 17, the float being folded in the bottom portion 16.

It should be observed that the fairing 15 may surround the rotary element in part only, the fairing then having only a bottom portion 16, for example. Furthermore, in a variant, this bottom portion may occupy no more than an angular sector β containing the float 20.

FIG. 5 is a section view showing the float 20 folded in the bottom portion 16.

In particular, the float 20 may be connected to the fairing by straps 500.

In addition, and with reference to FIG. 2, the bottom portion 16 may also include conventional means 50 for inflating the float.

The inflation means 50 communicate with a control system (not shown) suitable for causing the float 20 to be deployed from the fairing 15 under predetermined conditions.

With reference to FIG. 3, the inflation means inflate the float 20 in order to deploy it towards the outside EXT of the rotary element, i.e. outside the volume 200.

It should be observed that the float 20 may be made up of three portions, possibly corresponding to three bags. In the flow direction F of the air flow that passes through the rotary element, the float may then comprise in succession: an upstream portion 21, a central portion 22 in register with the fairing 15, and a downstream portion 23.

Under such circumstances, the inflation means 50 may deploy the float 20 out from the fairing 15 by inflating in succession the downstream portion 23, and then the central portion 22, and finally the upstream portion 21.

Consequently, the inflation means may inject an inflation fluid into the downstream portion 23, the downstream portion 23 being in communication with the central portion 22, the central portion communicating with the upstream portion 21.

FIGS. 6 to 8 show an inflation sequence for the float 20.

With reference to FIG. 4, in the inflated position, the float 20 may extend in the vertical plane of rotation P0 on either side of the vertical plane of symmetry P1, possibly in symmetrical manner.

Thus, the float 20 may extend from a first end section 24 towards a second end section 25 over a circular arc of the fairing covering a maximum angular sector β, e.g. having a value of about ninety degrees.

In another aspect, the float may enable the fairing 15 to be partially immersed together with the rotary element while nevertheless avoiding interference between the liquid surface and the blades 11.

When the aircraft is resting on the liquid surface with the float 20 in an inflated position, the float 20 rises along the fairing 15 on either side of the vertical plane of symmetry P1, such that a horizontal waterline plane P3 coincides with the liquid surface, this horizontal plane P3 being in register with a free ends 11" of the blades when the blades move in a given minimum angular sector α.

In contrast, it can be understood that immersion of the float must be limited to this horizontal plane P3 in order to avoid contact between the blades 11 and the liquid surface.

Consequently, with reference to FIGS. 3, 4, and 9, the float 20 may be of toroidal shape in the inflated position. This toroidal shape may be generated from a section, in particular a C-shaped section that surrounds part of the fairing. The toroidal shape is then obtained by turning said section about an axis of rotation AX of the blades 11 of the rotary element 10 through the maximum angular sector β, a concave face 26 of the C-shaped section being directed towards said axis of rotation and being in contact with the fairing.

Naturally, the present invention may be subjected to numerous variations as to its implementation. Although several embodiments are described, it will readily be understood that it is not conceivable to identify exhaustively all possible embodiments. It is naturally possible to replace any of the means described by equivalent means without going beyond the ambit of the present invention.

What is claimed is:

1. An aircraft provided with at least one rotary element provided with blades liable to come into contact with a liquid surface on ditching, said aircraft including a buoyancy system and a fairing surrounding at least part of said rotary element, the fairing including an inflatable emergency float of the buoyancy system for preventing said blades from coming into contact with the liquid surface when in an inflated position, said float having in succession in the flow direction of the air flow through the rotary element: an upstream portion, then a central portion arranged under the fairing, and a downstream portion; the aircraft including inflation means for deploying the float before ditching by successively inflating the downstream portion then the central portion and the upstream portion.

2. An aircraft according to claim 1, wherein said fairing has a bottom portion facing the ground when the aircraft is standing on said ground, and the float is folded in said bottom portion other than during a ditching stage in order to occupy a folded position.

3. An aircraft according to claim 1, said inflation means being configured to deploy said float outwards from said rotary element, the float being deployed outside the volume defined by said fairing within which said blades move.

4. An aircraft according to claim 1, wherein said inflation means open out into said downstream portion, said downstream portion communicating with the central portion, the central portion communicating with the upstream portion.

5. An aircraft according to claim 1, wherein said float extends up along said fairing on either side of a vertical plane of symmetry, the vertical plane of symmetry containing the axis of rotation of the blades of the rotary element and intersecting the liquid surface after ditching.

6. An aircraft provided with at least one rotary element provided with blades liable to come into contact with a liquid surface on ditching, the aircraft including a buoyancy system and a fairing surrounding at least part of the rotary element, the fairing including an inflatable emergency float of the buoyancy system configured to prevent the blades from coming into contact with the liquid surface when in an inflated position, the float having in succession in the flow direction of the air flow through the rotary element: an upstream portion, then a central portion arranged under the fairing, and a downstream portion; the aircraft including an inflator for deploying the float before ditching by successively inflating the downstream portion then the central portion and the upstream portion;
wherein the float is toroidal in shape when in the inflated position, the toroidal shape being generated by turning a C-shaped section about an axis of rotation of the blades of the rotary element, a concave face of the C-shaped section being directed towards the axis of rotation.

7. An aircraft according to claim 6, wherein the fairing has a bottom portion facing the ground when the aircraft is standing on the ground, the bottom portion defining a cavity, and wherein the float is folded in the cavity during normal aircraft operation.

8. An aircraft according to claim 7, wherein the fairing further includes a cover over the cavity, the cover configured to break open during deployment of the float.

9. An aircraft according to claim 6, the inflator being configured to deploy the float outwards from the rotary element, the float being deployed outside the volume defined by the fairing within which the blades move.

10. An aircraft according to claim 6, wherein the inflator opens out into the downstream portion, the downstream portion being in fluid communication with the central portion, the central portion being in fluid communication with the upstream portion.

11. An aircraft according to claim 6, wherein the fairing comprises a cylindrical housing defining an interior volume and having a bottom portion, and wherein when inflated the upstream portion and the downstream portion each extend vertically higher than the bottom portion on opposite sides of the cylindrical housing to form a barrier between the liquid surface and the interior volume.

12. An aircraft according to claim 11, wherein the rotary element defines a plane of rotation passing through the central portion of the float and the interior volume of the cylindrical housing.

13. An aircraft provided with a rotary element, the rotary element comprising a ducted tail rotor or ducted propeller having a fairing surrounding at least part of the rotary element, the aircraft including a buoyancy system, the fairing including an inflatable emergency float of the buoyancy system configured to prevent the blades from coming into contact with the liquid surface when in an inflated position, the float having in succession in the flow direction of the air flow through the rotary element: an upstream portion, then a central portion arranged under the fairing, and a downstream portion; the aircraft including an inflator for deploying the float before ditching by successively inflating the downstream portion then the central portion and the upstream portion.

14. An aircraft according to claim 13, wherein the fairing has a bottom portion facing the ground when the aircraft is standing on the ground, the bottom portion defining a cavity, and wherein the float is folded in the cavity during normal aircraft operation.

15. An aircraft according to claim 14, wherein the fairing further includes a cover over the cavity, the cover configured to break open during deployment of the float.

16. An aircraft according to claim 13, the inflator being configured to deploy the float outwards from the rotary element, the float being deployed outside the volume defined by the fairing within which the blades move.

17. An aircraft according to claim 13, wherein the inflator opens out into the downstream portion, the downstream portion being in fluid communication with the central portion, the central portion being in fluid communication with the upstream portion.

18. An aircraft according to claim 13, wherein the fairing comprises a cylindrical housing defining an interior volume and having a bottom portion, and wherein when inflated the upstream portion and the downstream portion each extend vertically higher than the bottom portion to form a barrier between the liquid surface and the interior volume.

19. An aircraft according to claim 18, wherein the rotary element defines a plane of rotation passing through the central portion of the float and the interior volume of the cylindrical housing.

* * * * *